US010239540B2

(12) United States Patent
Miura et al.

(10) Patent No.: US 10,239,540 B2
(45) Date of Patent: Mar. 26, 2019

(54) VEHICLE CONTROL DEVICE

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Takashi Miura, Toyota (JP); Seiji Masunaga, Nisshin (JP); Tomohiro Chimbe, Kariya (JP); Norihiro Tsukamoto, Toyota (JP); Tomohiro Asami, Nisshin (JP); Yuji Kajiyama, Anjo (JP); Kazuki Imanishi, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/726,070

(22) Filed: Oct. 5, 2017

(65) Prior Publication Data
US 2018/0118222 A1 May 3, 2018

(30) Foreign Application Priority Data
Oct. 28, 2016 (JP) .................................. 2016-212333

(51) Int. Cl.
*B60W 30/18* (2012.01)
*B60W 50/06* (2006.01)
(Continued)

(52) U.S. Cl.
CPC .......... *B60W 50/06* (2013.01); *B60W 10/023* (2013.01); *B60W 10/06* (2013.01);
(Continued)

(58) Field of Classification Search
CPC .......... B60W 30/18072; B60W 30/19; B60W 10/11; B60W 10/06; B60W 2510/0642; B60W 2510/1015
See application file for complete search history.

(56) References Cited

U.S. PATENT DOCUMENTS 6,666,794 B2 * 12/2003 Yuasa .................. F16H 61/061
477/117
6,740,005 B2 * 5/2004 Watanabe ............. B60W 10/06
477/107

(Continued)

FOREIGN PATENT DOCUMENTS

JP  2003-042281 A  2/2003

*Primary Examiner* — Erin D Bishop
(74) *Attorney, Agent, or Firm* — Oliff PLC

(57) ABSTRACT

A vehicle control device in a vehicle including an engine and a multi-speed transmission having a plurality of gear positions, each gear position out of the plurality of gear positions established by engaging predetermined engagement devices out of a plurality of engagement devices, the vehicle control device including a shift control portion configured to control release of a release-side engagement device of the plurality of engagement devices and engagement of an engagement-side engagement device of the plurality of engagement devices so as to switch the gear position established in the multi-speed transmission, and an engine control portion configured to provide idling-reduction control of temporarily stopping the operation of the engine based on a predetermined engine stop condition.

4 Claims, 5 Drawing Sheets

(51) Int. Cl.
    *B60W 10/02*     (2006.01)
    *B60W 10/06*     (2006.01)
    *B60W 10/11*     (2012.01)
    *B60W 30/188*     (2012.01)
    *B60W 50/00*     (2006.01)

(52) U.S. Cl.
    CPC .......... *B60W 10/11* (2013.01); *B60W 30/188* (2013.01); *B60W 30/18072* (2013.01); *B60W 2050/0014* (2013.01); *B60W 2050/0089* (2013.01); *B60W 2510/0283* (2013.01); *B60W 2510/0642* (2013.01); *B60W 2510/1015* (2013.01); *B60W 2710/024* (2013.01); *B60W 2710/1005* (2013.01)

(56) References Cited

U.S. PATENT DOCUMENTS

2003/0027685 A1     2/2003   Watanabe et al.
2004/0192484 A1     9/2004   Watanabe et al.

* cited by examiner

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT   BLANK: RELEASE

VEHICLE CONTROL DEVICE

INCORPORATION BY REFERENCE

The disclosure of Japanese Patent Application No. 2016-212333 filed on Oct. 28, 2016 including the specification, drawings and abstract is incorporated herein by reference in its entirety.

TECHNICAL FIELD

The present invention relates to a vehicle control device capable of providing shift control of a multi-speed transmission and idling-reduction control of an engine.

BACKGROUND ART

In a vehicle including an engine and a multi-speed transmission having any gear position established out of a plurality of gear positions by engaging predetermined engagement devices out of a plurality of engagement devices, a vehicle control device is well known that controls release of a release-side engagement device (the engagement device to be released) of the plurality of engagement devices and engagement of an engagement-side engagement device (the engagement device to be engaged) of the plurality of engagement devices so as to switch the gear position established in the multi-speed transmission (i.e., perform a clutch-to-clutch shift in the multi-speed transmission). For example, this corresponds to a shift control device of a vehicle automatic transmission described in Patent Document 1. In Patent Document 1, it is disclosed that in a coast downshift accompanied with a clutch-to-clutch shift, an occurrence of a tie-up state during the clutch-to-clutch shift is determined based on a racing amount of a turbine rotation speed (i.e., an input rotation speed of the automatic transmission) so as to correct an engagement pressure of the engagement-side engagement device through learning (learning control) in accordance with the tie-up state.

PRIOR ART DOCUMENT

Patent Document

Patent Document 1: Japanese Laid-Open Patent Publication No. 2003-42281

SUMMARY OF THE INVENTION

Problem to be Solved by the Invention

A vehicle is also well known that provides idling-reduction control in which an engine operation is temporarily stopped based on predetermined engine stop conditions. When the engine is stopped due to the idling-reduction control during a coast downshift in such a vehicle, an input rotation speed of a multi-speed transmission is restrained from racing because of a reduction in engine torque even if an engagement pressure of the engagement-side engagement device is insufficient. Therefore, if the engagement pressure of the engagement-side engagement device is corrected through learning based on the amount of racing when the idling-reduction control is provided, the learning may result in erroneous learning. On the other hand, if the learning of the engagement pressure of the engagement-side engagement device is uniformly inhibited when the idling-reduction control is provided during the coast downshift, a learning frequency may decrease and the convergence in learning may deteriorate.

The present invention was conceived in view of the situations and it is therefore an object of the present invention to provide a vehicle control device capable of suppressing a decrease in learning frequency and improving the convergence in learning when an instruction pressure of an engagement-side engagement device is corrected through learning based on an integrated value of a racing amount of an input rotation speed of a multi-speed transmission during a coast downshift.

Solution to Problem

A first aspect of the present invention provides a vehicle control device in a vehicle including (a) an engine and a multi-speed transmission having a plurality of gear positions, each gear position out of the plurality of gear positions established by engaging predetermined engagement devices out of a plurality of engagement devices, the vehicle control device including a shift control portion controlling release of a release-side engagement device of the plurality of engagement devices and engagement of an engagement-side engagement device of the plurality of engagement devices so as to switch the gear position established in the multi-speed transmission, and an engine control portion providing idling-reduction control of temporarily stopping the operation of the engine based on a predetermined engine stop condition, the vehicle control device comprising: (b) a racing amount calculating portion calculating, during a coast downshift in which an input rotation speed during a shift transition of the multi-speed transmission is equal to or less than an idle rotation speed of the engine, an integrated value of a racing amount of the input rotation speed that is an excess amount of the input rotation speed over a synchronous rotation speed after the coast downshift; and (c) a learning control portion obtaining and learning a correction amount for an instruction pressure of the engagement-side engagement device to be engaged during the coast downshift by using the integrated value of the racing amount so as to correct the instruction pressure of the engagement-side engagement device, wherein (d) if the idling-reduction control is started during the coast downshift, the racing amount calculating portion keeps the integrated value of the racing amount at a value at the start time point of the idling-reduction control.

A second aspect of the present invention provides the vehicle control device according to the first aspect of the present invention, when the idling-reduction control is started during the coast downshift and the integrated value of the racing amount is in an excessive racing state of being equal to or greater than a predetermined integrated value, the learning control portion increases and corrects the instruction pressure of the engagement-side engagement device through learning by using the correction amount obtained by using the accumulation value of the racing amount kept at the value at the start time point of the idling-reduction control.

A third aspect of the present invention provides the vehicle control device according to the first or second aspect of the present invention, when the integrated value of the racing amount is not in the excessive racing state of being equal to or greater than a predetermined integrated value during the coast downshift, the learning control portion decreases and corrects the instruction pressure of the engagement-side engagement device through learning by using a predetermined correction amount on condition that the number of times of the coast downshifts performed in a state other than the excessive racing state without being followed by correction of the instruction pressure of the engagement-side engagement device is equal to or greater than a predetermined number of times, and when the idling-reduction control is started during the coast downshift, the learning control portion does not perform learning for decreasing and correcting the instruction pressure of the engagement-side engagement device even in the absence of the excessive racing state.

Advantageous Effects of the Invention

According to the first aspect of the present invention, if the idling-reduction control is started during the coast downshift at the input rotation speed during the shift transition of the multi-speed transmission equal to or less than the idle rotation speed of the engine, the integrated value of the racing amount of the input rotation speed calculated during the coast downshift is kept at the value at the start time point of the idling-reduction control, and therefore, the instruction pressure of the engagement-side engagement device can be corrected through learning based on the integrated value of the racing amount not affected by the idling-reduction control. As a result, if the idling-reduction control is executed during the coast downshift, the learning of the instruction pressure of the engagement-side engagement device can be performed while avoiding the erroneous learning due to the effect of the idling-reduction control. Therefore, if the instruction pressure of the engagement-side engagement device is corrected through learning based on the integrated value of the racing amount of the input rotation speed during the coast downshift of the multi-speed transmission, a decrease in learning frequency can be suppressed and the convergence in learning can be improved.

According to the second aspect of the present invention, when the idling-reduction control is started during the coast downshift of the multi-speed transmission and the integrated value of the racing amount is in the excessive racing state of being equal to or greater than the predetermined integrated value, the instruction pressure of the engagement-side engagement device is increased and corrected through learning by using the correction amount obtained by using the integrated value of the racing amount kept at the value at the start time point of the idling-reduction control, and therefore, even when the idling-reduction control is started during the coast downshift, the excessive racing state of the input rotation speed can be suppressed in the subsequent coast downshifts.

According to the third aspect of the present invention, if the idling-reduction control is started during the coast downshift of the multi-speed transmission, the learning for decreasing and correcting the instruction pressure of the engagement-side engagement device is not performed even in the absence of the excessive racing state, and therefore, while the excessive racing state might not have occurred because of a reduction in the engine torque due to the idling-reduction control, the erroneous learning due to the effect of the idling-reduction control can be avoided by not performing the learning for decreasing and correcting the instruction pressure of the engagement-side engagement device.

MODES FOR CARRYING OUT THE INVENTION

An example of the present invention will now be described in detail with reference to the drawings.

EXAMPLE

Figure 1:
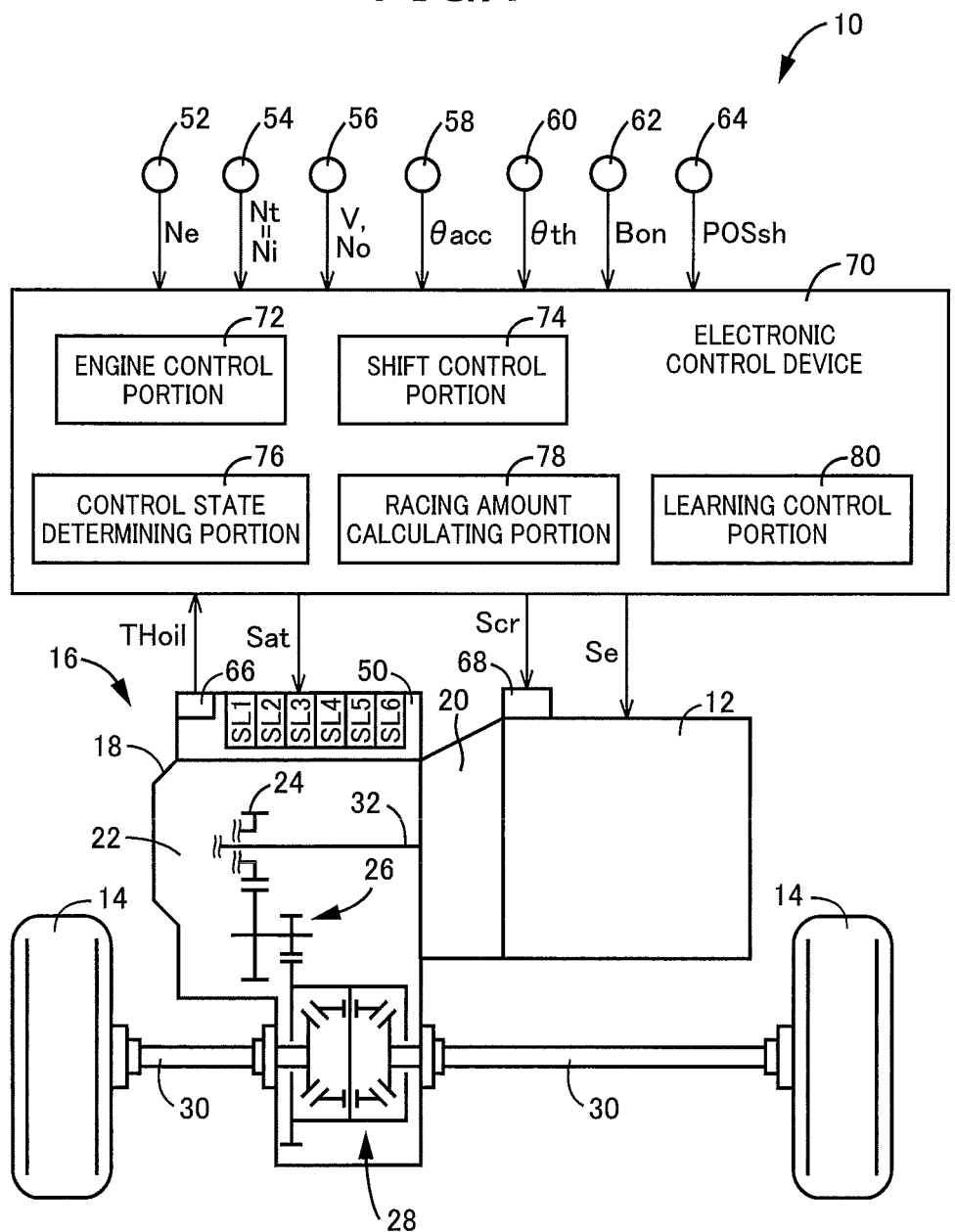
FIG. 1 is a diagram for explaining a general configuration of a vehicle to which the present invention is applied and is a diagram for explaining main portions of a control function and a control system for various controls in the vehicle.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes, in a case 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, the power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the driving wheels 14.

The engine 12 is a drive force source of the vehicle 10 and is a known internal combustion engine such as a gasoline engine and a diesel engine. In the engine 12, engine torque Te is controlled through control of an operational state such as an intake air amount, a fuel supply amount, and an ignition timing by an electronic control device 70 described later.

Figures 2, 3:
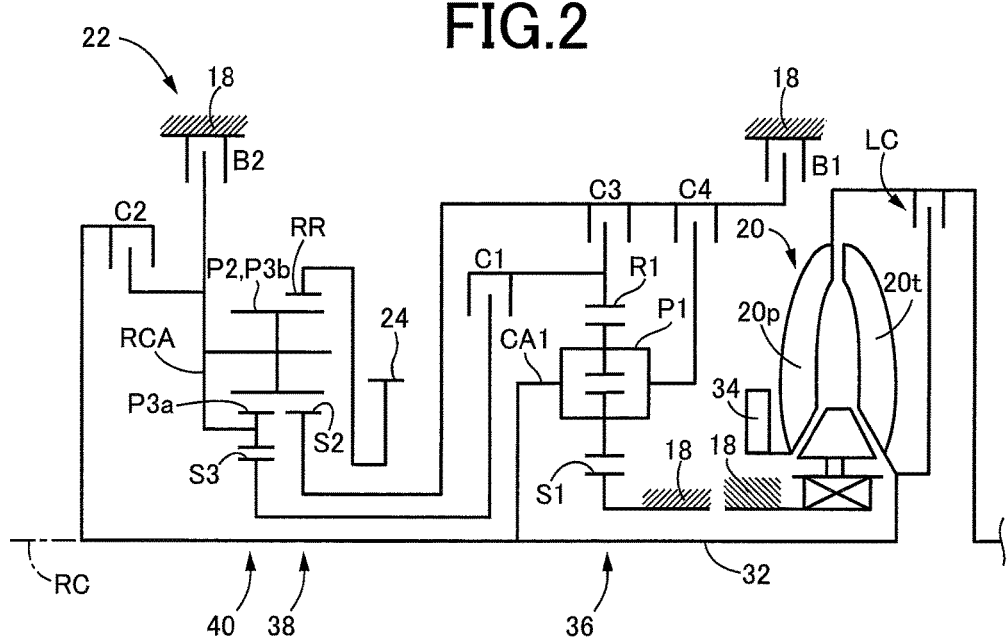
FIG. 2 is a schematic for explaining an example of a torque converter and an automatic transmission.
FIG. 3 is an engagement operation table for explaining a relationship between a shift operation of the automatic transmission and a combination of operations of engagement devices used therefor.

FIG. 2 is a schematic for explaining an example of the torque converter 20 and the automatic transmission 22. The torque converter 20, the automatic transmission 22, etc. are configured substantially symmetrically with respect to an axial center RC of a transmission input shaft 32 that is an input rotating member of the automatic transmission 22 and have lower halves from the axial center RC not shown in FIG. 2.

In FIG. 2, the torque converter 20 is disposed to rotate around the axial center RC in a power transmission path between the engine 12 and the automatic transmission 22 and is a fluid transmission device including a pump impeller 20p coupled to the engine 12, a turbine impeller 20t coupled to the transmission input shaft 32, etc. The transmission input shaft 32 also serves as a turbine shaft rotationally driven by the turbine impeller 20t. The power transmission device 16 also includes a lockup clutch LC capable of direct coupling between the pump impeller 20p and the turbine impeller 20t (i.e., between input/output rotating members of the torque converter 20). The power transmission device 16 also includes a mechanical oil pump 34 coupled to the pump impeller 20p. The oil pump 34 is rotationally driven by the engine 12 to discharge hydraulic fluid used for a shift control of the automatic transmission 22 and for supplying lubrication oil to portions of the power transmission path of the power transmission device 16. Therefore, the hydraulic fluid pumped up by the oil pump 34 is supplied as a source pressure of a hydraulic control circuit 50 (see FIG. 1) included in the vehicle 10.

The automatic transmission 22 is a multi-speed type automatic transmission constituting a portion of the power transmission path between the engine 12 and the drive wheels 14. The automatic transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The automatic transmission 22 includes a first clutch C1, a second clutch C2, a third clutch C3, a fourth clutch C4, a first brake B1, and a second brake B2 as a plurality of engagement devices (hereinafter simply referred to as engagement devices C if not particularly distinguished).

The first planetary gear device 36 includes a first sun gear S1, a plurality of pairs of first planetary gears P1 meshing with each other, a first carrier CA1 supporting the first planetary gear P1 such that the first planetary gear P1 is rotatable about its axis and an axis of the first planetary gear device, and a first ring gear R1 meshing via the first planetary gear P1 with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

The engagement devices C are hydraulic friction engagement devices made up of wet multiplate type clutches and brakes pressed by hydraulic actuators, band brakes fastened by hydraulic actuators, etc. The engagement devices C have respective torque capacities (clutch torques) Tc (i.e., clutch torques Tc1, Tc2, Tc3, Tc4, Tb1, Tb2) changed in accordance with hydraulic pressures (clutch pressures) Pc (i.e., clutch pressures Pc1, Pc2, Pc3, Pc4, Pb1, Pb2) output respectively from solenoid valves SL1 to SL6 etc. in the hydraulic control circuit 50, so that the respective operation states (states such as engagement and release) are switched. To transmit a torque (e.g., an input torque Ti, i.e., a turbine torque Tt, input to the transmission input shaft 32) between the transmission input shaft 32 and the transmission output gear 24 without slipping the engagement devices C (i.e., without generating a differential rotation speed in the engagement devices C), each of the engagement devices C needs to have a torque capacity capable of providing a transmission torque that must be assigned to the engagement device C (i.e., a shared torque of the engagement device C) with respect to the torque. However, at the torque capacity capable of providing the transmitted torque, the transmission torque does not increase even if the torque capacity is increased. In this example, the clutch torque Tc and the clutch pressure Pc may synonymously be used for convenience.

In the automatic transmission 22, the first sun gear S1 is coupled to the case 18. The first carrier CA1 is coupled to the transmission input shaft 32. The first carrier CA1 and the second sun gear S2 are selectively coupled via the fourth clutch C4. The first ring gear R1 and the third sun gear S3 are selectively coupled via the first clutch C1. The first ring gear R1 and the second sun gear S2 are selectively coupled via the third clutch C3. The second sun gear S2 is selectively coupled via the first brake B1 to the case 18. The carrier RCA is selectively coupled via the second clutch C2 to the transmission input shaft 32. The carrier RCA is selectively coupled via the second brake B2 to the case 18. The ring gear RR is coupled to the transmission output gear 24.

The automatic transmission 22 is a multi-speed transmission having any gear position established out of a plurality of gear positions (gear shift positions) different in gear ratio (speed change ratio) γ (=input rotation speed Ni of the automatic transmission 22/output rotation speed No of the automatic transmission 22) by engagement of predetermined engagement devices out of the engagement devices C. The automatic transmission 22 allows switching of the gear positions (i.e., selective establishment of the plurality of gear positions) established by controlling release of a release-side engagement device out of the engagement devices C and engagement of an engagement-side engagement device out of the engagement devices C by the electronic control device 70 described later in accordance with a driver's accelerator operation, a vehicle speed V, etc. For example, as shown in an engagement operation table in FIG. 3, the automatic transmission 22 has eight forward gear positions from a first speed gear position "1st" to an eighth speed gear position "8th" and a reverse gear position "Rev" such that the gear positions are selectively established. The input rotation speed Ni of the automatic transmission 22 is a rotation speed of the transmission input shaft 32 (i.e., an input rotation speed of the automatic transmission 22) and the output rotation speed No of the automatic transmission 22 is a rotation speed of the transmission output gear 24 (i.e., an output rotation speed of the automatic transmission 22). The gear ratio γ of the automatic transmission 22 corresponding to each of the gear positions is appropriately defined by gear ratios (=the number of teeth of the sun gear/the number of teeth of the ring gear) ρ1, ρ2, and ρ3 of the first planetary gear device 36, the second planetary gear device 38, and the third planetary gear device 40. The gear ratio γ is the highest at the first speed gear position "1st" and decreases toward the higher vehicle speed side (the eighth speed gear position "8th" side).

The engagement operation table of FIG. 3 represents the relationship between the gear positions established in the automatic transmission 22 and the operation states of the engagement devices C (predetermined engagement devices that are the engagement devices engaged in the respective gear positions), and "∘" and a blank indicate engagement (i.e., the predetermined engagement devices of the respective gear positions) and release of the engagement devices C, respectively. As shown in FIG. 3, among the forward gear positions, the first speed gear position "1st" is established by engagement of the first clutch C1 and the second brake B2. The second speed gear position "2nd" is established by engagement of the first clutch C1 and the first brake B1. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When the engagement devices C are all released, the automatic transmission 22 is brought into a neutral state in which no gear position is established (i.e., a neutral state in which power transmission is interrupted).

Returning to FIG. 1, the vehicle 10 includes the electronic control device 70 including a control device of the vehicle 10 related to the shift control of the automatic transmission 22, for example. Therefore, FIG. 1 is a diagram of an input/output system of the electronic control device 70 and is a functional block diagram for explaining a main portion of the control function by the electronic control device 70. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the automatic transmission 22, etc., and is configured separately for the engine output control, the hydraulic control (the shift control), etc., as needed.

The electronic control device 70 is supplied with various signals (e.g., an engine rotation speed Ne, the input rotation speed Ni of the automatic transmission 22 that is also the rotation speed of the turbine shaft (i.e., a turbine rotation speed Nt), the output rotation speed No of the automatic transmission 22 corresponding to the vehicle speed V, an accelerator opening degree θacc that is an operation amount of an accelerator pedal, a throttle valve opening degree θth that is an opening degree of an electronic throttle valve, a brake-on Bon that is a signal indicative of a brake operation state when a driver operates a brake operation member for operating a wheel brake, a shift-lever operation position (shift position) POSsh such as "P (parking)", "R (reverse, backward running)", "N (neutral)", "D (drive, forward running)", etc., and a hydraulic fluid temperature THoil that is a temperature of hydraulic fluid in the hydraulic control circuit 50) based on detection values from various sensors etc. disposed in the vehicle 10 (e.g., an engine rotation speed sensor 52, an input rotation speed sensor 54, an output rotation speed sensor 56, an accelerator opening degree sensor 58, a throttle valve opening degree sensor 60, a brake switch 62, a shift position sensor 64, and an oil temperature sensor 66). The electronic control device 70 supplies various devices included in the vehicle 10 (e.g., the engine 12, the hydraulic control circuit 50, a starter 68 cranking the engine 12 at the engine start) with various command signals (e.g., an engine control command signal Se, a hydraulic control command signal Sat, and a cranking control command signal Scr). This hydraulic pressure control command signal Sat is a command signal (hydraulic pressure command value, instruction pressure) for driving the solenoid valves SL1 to SL6 regulating the clutch pressures Pc supplied to the hydraulic actuators of the engagement devices C and is output to the hydraulic control circuit 50.

To implement the control function for various controls in the vehicle 10, the electronic control device 70 includes an engine control means, i.e., an engine control portion 72 and a shift control means, i.e., a shift control portion 74.

The engine control portion 72 applies the accelerator opening degree θacc and the vehicle speed V (synonymous with the output rotation speed No of the automatic transmission 22, etc.) to, for example, a relationship (e.g., a drive force map) obtained empirically or through design and stored in advance (i.e., predefined) to calculate a required drive force Fdem. The engine control portion 72 sets a target engine torque Tetgt at which the required drive force Fdem is acquired, in consideration of a transmission loss, an accessory load, the gear ratio γ of the automatic transmission 22, etc., and outputs the engine control command signal Se for providing the output control of the engine 12 to a throttle actuator, a fuel injection device, an ignition device, etc. such that the target engine torque Tetgt is acquired.

For example, to improve fuel consumption, the engine control portion 72 provides automatic stop/restart control of the engine 12 (hereinafter referred to as idling-reduction control) in which the operation of the engine 12 is automatically temporarily stopped based on predetermined engine stop conditions regardless of user's operation and subsequently automatically restarted. Specifically, when the predetermined engine stop conditions for providing the idling-reduction control are satisfied, the engine control portion 72 starts the idling-reduction control by outputting to the fuel injection device etc. an engine temporary stop command for providing fuel-cut control etc. of stopping fuel supply to the engine 12 so as to temporarily automatically stop the engine 12. When the predetermined engine stop conditions are no longer satisfied during the idling-reduction control, the engine control portion 72 cancels the idling-reduction control by outputting to the fuel injection device etc. an engine restart command for cranking the engine 12 by the starter 68 and providing opening/closing control of an electronic throttle valve, fuel supply control, ignition timing control, etc. so as to automatically restart the engine 12. The predetermined engine stop conditions are, for example, such conditions that the vehicle is in a stop state in which the vehicle speed V is determined as zero, that the accelerator is turned off, that the warm-up of the engine 12 has been completed, and that the signal of brake-on Bon has been output. The idling-reduction control may be canceled on a condition different from the condition that the predetermined engine stop conditions are not satisfied. Alternatively, the idling-reduction control may not necessarily be canceled when the predetermined engine stop conditions are not satisfied. For example, when the brake is turned off, the predetermined engine stop conditions are no longer satisfied; however, when the shift position POSsh is at the P or N position, the engine 12 may not be restarted even if the brake is turned off.

The shift control portion 74 uses, for example, a predefined relationship (shift map, shift diagram) to determine whether to provide a control of switching the gear position of the automatic transmission 22, and thereby determines a shift of the automatic transmission 22. The shift control portion 74 applies a vehicle speed related value and a drive request amount to the shift map to determine the shift of the automatic transmission 22 (i.e., determine the gear position to be established in the automatic transmission 22). The shift control portion 74 outputs to the hydraulic control circuit 50 a shift command for engaging and/or releasing the engagement devices C involved in the shift of the automatic transmission 22 as the hydraulic control command signal Sat so as to establish the determined gear position.

The shift map is a predetermined relationship having shift lines for determining the shift of the automatic transmission 22 on two-dimensional coordinates having the vehicle speed related value and the drive request amount as variables. The shift lines in the shift map are up lines for determining an upshift and down lines for determining a downshift. The up lines and the down lines are each determined in advance between each adjacent gear positions out of the plurality of gear positions. The shift lines are each used for determining whether the actual vehicle speed related value and/or the actual drive request amount exceeds or falls below a value (shift point) at which a shift should be executed. Each of the shift lines is defined in advance as a series of corresponding shift points. The vehicle speed related value is the vehicle speed V or a value related to the vehicle speed V and is, for example, a wheel speed, or the output rotation speed No of the automatic transmission 22. The drive request amount is a value representative of a magnitude of a drive request from a driver to the vehicle 10 and is, for example, the required drive force Fdem [N] described above or a required drive torque [Nm] and a required drive power [W] related to the required drive force Fdem. The accelerator opening degree θacc [%], the throttle valve opening degree θth [%], the intake air amount [g/sec], etc. can simply be used as the drive request amount.

At the time of the shift of the automatic transmission 22, the shift control portion 74 performs a so-called clutch-to-clutch shift switching the gear position established in the automatic transmission 22 by making a change in engagement of the engagement devices (by controlling the release-side engagement device, the engagement-side engagement device) involved in the shift of the automatic transmission 22 out of the engagement devices C. For example, in the 2-to-1 downshift from the second speed gear position "2nd" to the first speed gear position "1st", the clutch-to-clutch shift is performed by making a change in engagement of the first brake B1 and the second brake B2 (i.e., releasing the first brake B1 and engaging the second brake B2). In this example, out of the engagement devices C which are between engaged state and released state during the shift, the release-side engagement device is the engagement device to be released, and the engagement-side engagement device is the engagement device to be engaged. The hydraulic control command signal Sat is an instruction pressure of the release-side engagement device (also referred to as a release-side instruction pressure) that is a command signal to the hydraulic control circuit 50 generating a clutch pressure of the release-side engagement device (also referred to as a release-side clutch pressure) for acquiring a clutch torque of the release-side engagement device (also referred to as a release-side clutch torque) at the time of the shift, and an instruction pressure of the engagement-side engagement device (also referred to as an engagement-side instruction pressure) that is a command signal to the hydraulic control circuit 50 generating a clutch pressure of the engagement-side engagement device (also referred to as an engagement-side clutch pressure) for acquiring a clutch torque of the engagement-side engagement device (also referred to as an engagement-side clutch torque) at the time of the shift.

The control at the time of a coast downshift of the automatic transmission 22 will be described in detail. The coast downshift of the automatic transmission 22 is one of power-off downshifts that are downshifts determined (requested) due to a reduction in the drive request amount (e.g., the accelerator opening degree θacc) or a decrease in the vehicle speed related value (e.g., the vehicle speed V) during deceleration running with the accelerator turned off, and is a downshift requested while the deceleration running state with the accelerator turned off continues. It is noted that a power-off state is a driven state that is a state in which the torque based on the engine torque Te transmitted toward the drive wheels 14 in the automatic transmission 22 is smaller than the torque based on a road load transmitted toward the engine 12 in the automatic transmission 22.

In the power-off downshift, the turbine rotation speed Nt cannot be increased to a synchronous rotation speed Ntsyc (=No*the gear ratio γ after the downshift) unless the clutch torque of the engagement-side engagement device establishing the gear position after the downshift is generated, and it is therefore preferable that the control of the engagement-side clutch torque is mainly provided to make the downshift progress. However, in the coast downshift at the turbine rotation speed Nt during a shift transition of the automatic transmission 22 equal to or less than an idle rotation speed of the engine 12, the turbine rotation speed Nt can be increased to the synchronous rotation speed Ntsyc after the downshift even if the engagement-side clutch torque is not generated. The coast downshift at the turbine rotation speed Nt during the shift transition equal to or less than the idle rotation speed of the engine 12 is the 2-to-1 coast downshift in which the execution of the coast downshift is determined at a low vehicle speed near the stop of the vehicle, for example. In the coast downshift, the engine rotation speed Ne is maintained at the idle rotation speed of the engine 12 in the deceleration running state with the accelerator turned off, for example. The idle rotation speed of the engine 12 is the engine rotation speed Ne in the idling state of the engine 12, which is a state in which the engine 12 outputs the power driving the vehicle accessories for driving the accessories so as to output the power necessary for autonomous operation of the engine 12, for example.

By the shift command from the shift control portion 74 at the time of the coast downshift (particularly, at the time of the 2-to-1 coast downshift) of the automatic transmission 22 at the turbine rotation speed Nt during a shift transition of the automatic transmission 22 equal to or less than the idle rotation speed of the engine 12, first, the release-side instruction pressure is rapidly lowered to a predetermined pressure defined in advance, and the release-side instruction pressure is then gradually reduced toward a predefined standby pressure Psbr with a gentle gradient so as to start an inertia phase while the engagement-side instruction pressure is temporarily increased to a predetermined pressure defined in advance for packing of the engagement-side engagement device, and subsequently, the engagement-side instruction pressure is set to a standby pressure Psbc defined in advance. When the turbine rotation speed Nt starts increasing to start the inertia phase and the turbine rotation speed Nt then reaches the synchronous rotation speed Ntsyc after the downshift, the release-side instruction pressure is gradually reduced from the standby pressure Psbr toward the minimum value (zero value) and the engagement-side instruction pressure is increased from the standby pressure Psbc with a predefined gradient. In this case, the racing (temporary increase) of the turbine rotation speed Nt is generated so that the turbine rotation speed Nt exceeds the synchronous rotation speed Ntsyc after the downshift. When the racing of the turbine rotation speed Nt converges and the turbine rotation speed Nt is synchronized with the synchronous rotation speed Ntsyc after the downshift, the engagement-side instruction pressure is gradually increased toward the maximum value (complete engagement pressure) so as to completely engage the engagement-side engagement device.

In the coast downshift in which the turbine rotation speed Nt during the shift transition is equal to or less than the idle rotation speed of the engine 12, the racing of the turbine rotation speed Nt occurs because the turbine rotation speed Nt is raised by the engine 12 in the idling state even when the accelerator is turned off. Such racing of the turbine rotation speed Nt can be made more difficult to occur when the engagement-side clutch pressure is made higher in the coast downshift process, for example. However, if the engagement-side clutch pressure is made too high, a degree of overlap becomes excessive between the engagement state of the release-side engagement device and the engagement state of the engagement-side engagement device (i.e., tie-up becomes excessive), which may lead to a deterioration in drivability due to occurrence of shock. On the other hand, excessive racing of the turbine rotation speed Nt may also lead to a deterioration in drivability.

From the above, in this example, the engagement-side instruction pressure (particularly, the standby pressure Psbc) is set in the coast downshift at the turbine rotation speed Nt during the shift transition equal to or lower than the idle rotation speed of the engine 12 such that an integrated value S (also referred to as a turbine racing integrated amount S or a racing integrated amount S) of a racing amount $\Delta Nt$ of the turbine rotation speed Nt (also referred to as a turbine racing amount $\Delta Nt$ or a racing amount $\Delta Nt$) becomes less than a predetermined integrated amount Sf. It is noted that setting the standby pressure Psbc corresponds to setting an engagement-side instruction pressure increased from the standby pressure Psbc with a predefined gradient. The racing amount $\Delta Nt$ is a difference (=Nt−Ntsyc) between the actual value of the turbine rotation speed Nt and the synchronous rotation speed Ntsyc when the turbine rotation speed Nt exceeds the synchronous rotation speed Ntsyc after the downshift. The racing integrated amount S is a value acquired by accumulating (summing) the racing amount $\Delta Nt$ calculated during one coast downshift. The predetermined integrated amount Sf is a predefined threshold value when the racing of the turbine rotation speed Nt is generated in a proper state in the coast downshift.

Due to individual variations and aging of the engagement devices C and the solenoid valves SL1 to SL6 etc. in the hydraulic control circuit 50, variations occur in the actual release-side clutch pressure with respect to the release-side instruction pressure, or variations occur in the actual engagement-side clutch pressure with respect to the engagement-side instruction pressure. As a result, the engagement-side instruction pressure set in the coast downshift may not make the racing integrated amount S less than the predetermined integrated amount Sf. Therefore, the electronic control device 70 corrects the engagement-side instruction pressure through learning so as not to allow the coast downshift to progress in an excessive racing state in which the racing integrated amount S is equal to or greater than the predetermined integrated amount Sf and so as to achieve a proper racing state (from another viewpoint, a proper tie-up state) in which the racing of the turbine rotation speed Nt is generated to some extent.

To implement the control of correcting the engagement-side instruction pressure in the coast downshift through learning as described above, the electronic control device 70 further includes a control state determining means, i.e., a control state determining portion 76, a racing amount calculating means, i.e., a racing amount calculating portion 78, and a learning control means, i.e., a learning control portion 80.

The control state determining portion 76 determines whether the coast downshift of the automatic transmission 22 (particularly, the coast downshift at the turbine rotation speed Nt during the shift transition equal to or less than the idle rotation speed of the engine 12) is in progress, based on the hydraulic control command signal Sat output by the shift control portion 74, for example. The control state determining portion 76 also determines whether the coast downshift of the automatic transmission 22 is completed, based on the hydraulic control command signal Sat output by the shift control portion 74, for example.

The control state determining portion 76 determines whether the learning control portion 80 is permitted to provide learning control (i.e., learning is permitted), based on whether a predetermined learning permission condition is satisfied, for example. This predetermined learning permission condition is that the hydraulic fluid temperature THoil is within a predefined oil temperature range suitable for the learning control, for example.

If the control state determining portion 76 determines that learning is permitted and that it is a period after the control state determining portion 76 determines that the coast downshift of the automatic transmission 22 is in progress and before it is determined that the coast downshift is completed, the racing amount calculating portion 78 calculates the turbine racing integrated amount S. Specifically, during the coast downshift at the turbine rotation speed Nt during the shift transition of the automatic transmission 22 equal to or less than the idle rotation speed of the engine 12, if the turbine rotation speed Nt has exceeded the synchronous rotation speed Ntsyc after the downshift, the racing amount calculating portion 78 calculates the turbine racing amount $\Delta Nt$ and then adds the turbine racing amount $\Delta Nt$ to a current racing integrated amount S to calculate a new racing integrated amount S. The racing amount calculating portion 78 then updates (rewrites) the current racing integrated amount S to the new calculated racing integrated amount S. It is noted that the initial value of the racing integrated amount S in the currently provided coast downshift is set to zero.

If the control state determining portion 76 determines that the coast downshift of the automatic transmission 22 is in progress and that learning is permitted, and that the coast downshift of the automatic transmission 22 is completed, the learning control portion 80 performs coast-downshift learning by obtaining a correction amount $\Delta Psbc$ for the engagement-side instruction pressure in the coast downshift by using the racing integrated amount S calculated by the racing amount calculating portion 78 and learning the engagement-side instruction pressure so as to correct the engagement-side instruction pressure in the coast downshift.

Specifically, when it is determined that the coast downshift of the automatic transmission 22 is completed, the control state determining portion 76 determines whether the racing integrated amount S calculated by the racing amount calculating portion 78 is equal to or greater than the predetermined integrated amount Sf. Determining whether the racing integrated amount S is equal to or greater than the predetermined integrated amount Sf is to determine whether the racing integrated amount S is in an excessive racing state of being equal to or greater than the predetermined integrated amount Sf. The state of the racing integrated amount S being equal to or greater than the predetermined integrated amount Sf is the excessive racing state of the turbine rotation speed Nt in the coast downshift, and the state of the racing integrated amount S being less than the predetermined integrated amount Sf is the proper racing state in the coast downshift. Although the state of the racing integrated amount S being less than the predetermined integrated amount Sf includes the state in which the racing of the turbine rotation speed Nt is not generated, i.e. the state in which the racing integrated amount S is zero, the state referred to as the proper racing state in this example includes the state in which the racing is not generated, for convenience.

If the control state determining portion 76 determines that the racing integrated amount S is equal to or greater than the predetermined integrated amount Sf (i.e., if it is determined that the turbine rotation speed Nt is in the excessive racing state during the coast downshift), the learning control portion 80 permits racing learning for correcting the engagement-side instruction pressure through learning such that the excessive racing state of the turbine rotation speed Nt in the coast downshift is suppressed, and performs the racing learning. In this racing learning, the learning control portion 80 increases and corrects the engagement-side instruction pressure through learning by using the correction amount ΔPsbc. For example, the learning control portion 80 obtains the correction amount ΔPsbc (>0) by using the racing integrated amount S and adds the correction amount ΔPsbc (>0) to the current standby pressure Psbc of the engagement-side instruction pressure to increase and correct the engagement-side instruction pressure used for the next coast downshift of the automatic transmission 22. The correction amount ΔPsbc (>0) at the time of the increasing correction is a value defined in advance such that the value becomes larger when the difference ΔS (=S−Sf) between the racing integrated amount S and the predetermined integrated amount Sf is larger, for example. This racing learning is a kind of coast downshift learning. The predetermined integrated amount Sf is a racing-learning execution determination threshold value.

if the control state determining portion 76 determines that the racing integrated amount S is in the proper racing state of being less than the predetermined integrated amount Sf (i.e., if it is determined that the turbine rotation speed Nt is not in the excessive racing state during the coast downshift), the learning control portion 80 permits tie-up learning for correcting the engagement-side instruction pressure through the learning so as not to make the tie-up excessive and performs the tie-up learning on condition that the number of times of the coast downshifts performed in the state other than the excessive racing state (i.e., in the proper racing state) without being followed by the correction of the engagement-side instruction pressure is equal to or greater than a predetermined number of times. In this tie-up learning, the learning control portion 80 decreases and corrects the engagement-side instruction pressure through learning by using a tie-up learning correction amount ΔPsbct. For example, the learning control portion 80 adds the tie-up learning correction amount ΔPsbct (<0) to the current standby pressure Psbc of the engagement-side instruction pressure to decrease and correct the engagement-side instruction pressure used for the next coast downshift of the automatic transmission 22. This tie-up learning correction amount ΔPsbct (<0) is a constant value defined in advance as a predetermined correction amount for the tie-up learning, for example. This tie-up learning is a kind of the coast downshift learning. The learning under the proper racing state is the learning to prevent excessive tie-up and is therefore referred to as the tie-up learning.

The number of times of the coast downshifts performed in the proper racing state without being followed by the correction of the engagement-side instruction pressure is used as the condition because of suppression and avoidance of hunting between the increasing correction and the decreasing correction of the engagement-side instruction pressure, for example. Another reason is that the aging such as deterioration in friction material of the engagement devices C tends to increase the racing integrated amount S and lead to the increasing correction, and the tie-up learning may be permitted regularly (e.g., about once per dozen coast downshifts) for the decreasing correction on the assumption that the tie-up becomes excessive and deteriorates the drivability due to individual product variation. In this example, the absence of correction of the engagement-side instruction pressure (i.e., the absence of execution of the tie-up learning) after the coast downshift performed in the proper racing state is referred to as maintenance of current tie-up, which represents the maintenance of the current tie-up in the proper racing state. If it is determined that the racing integrated amount S is less than the predetermined integrated amount Sf, the control state determining portion 76 determines whether the number of times of maintenance of current tie-up is equal to or greater than a predetermined number of times. If the control state determining portion 76 determines that the number of times of maintenance of current tie-up is less than the predetermined number of times, the learning control portion 80 does not permit the tie-up learning, maintains the current tie-up, and increments the number of times of maintenance of current tie-up by one. If the control state determining portion 76 determines that the number of times of maintenance of current tie-up is equal to or greater than the predetermined number of times, the learning control portion 80 permits the tie-up learning, performs the tie-up learning, and resets the number of times of maintenance of current tie-up to zero. However, even though the number of times of maintenance of current tie-up is less than the predetermined number of times, the learning control portion 80 desirably permits the tie-up learning if the racing integrated amount S is zero. The predetermined number of times is a predetermined threshold value defined in advance for avoiding or restraining a deterioration in drivability from occurring, for example. It is noted that when permitting the racing learning and performing the racing learning, the learning control portion 80 resets the number of times of maintenance of current tie-up to zero.

Even though the control state determining portion 76 determines that the coast downshift of the automatic transmission 22 is in progress, the learning control portion 80 inhibits the coast downshift learning if it is determined that learning is not permitted.

Since the coast downshift at the turbine rotation speed Nt during the shift transition equal to or less than the idle rotation speed of the engine 12 (particularly, the 2-to-1 coast downshift) is started at a low vehicle speed, the coast downshift may not be completed before the vehicle stops. As a result, the vehicle may stop during the coast downshift and the idling-reduction control may be provided. In such a case, since the engine torque Te becomes lower, the racing of the turbine rotation speed Nt is suppressed even when the engagement-side clutch pressure is insufficient. Therefore, if the coast downshift learning is performed based on the racing integrated amount S in such a state, erroneous learning may occur. On the other hand, if the coast downshift learning is uniformly inhibited when the idling-reduction control is provided during the coast downshift, the convergence in learning may deteriorate. From another viewpoint, if the racing integrated amount S is less than the predetermined integrated amount Sf, the turbine rotation speed Nt might not have entered the excessive racing state because of a reduction in the engine torque Te due to the idling-reduction control. Therefore, if the tie-up learning is performed by the learning control portion 80 when the racing integrated amount S is less than the predetermined integrated amount Sf, erroneous learning may occur.

Therefore, when the idling-reduction control is started by the engine control portion 72 during the coast downshift of the automatic transmission 22, the racing amount calculating portion 78 keeps the racing integrated amount S at the value at the start time point of the idling-reduction control.

Specifically, when determining that the coast downshift of the automatic transmission 22 is in progress, the control state determining portion 76 determines whether the idling-reduction control is started by the engine control portion 72. If the control state determining portion 76 determines that the idling-reduction control is started, the learning control portion 80 sets an idling-reduction control history flag to ON. The control state determining portion 76 determines whether the idling-reduction control history flag is set to ON by the learning control portion 80.

If the control state determining portion 76 determines that the coast downshift is in progress and the control state determining portion 76 further determines that the idling-reduction control history flag is not set to ON, the racing amount calculating portion 78 calculates the turbine racing integrated amount S. On the other hand, if the control state determining portion 76 determines that the coast downshift is in progress and the control state determining portion 76 further determines that the idling-reduction control history flag is set to ON, the racing amount calculating portion 78 keeps the racing integrated amount S used for the coast downshift learning by the learning control portion 80 at the current value of the racing integrated amount S. Therefore, the racing amount calculating portion 78 does not update the racing integrated amount S if the idling-reduction control history flag is set to ON.

After the control state determining portion 76 determines that the coast downshift is in progress, if the control state determining portion 76 further determines that the idling-reduction control is started and the control state determining portion 76 also determines that the racing integrated amount S is equal to or greater than the predetermined integrated amount Sf (i.e., if it is determined that the turbine rotation speed Nt is in the excessive racing state during the coast downshift), the learning control portion 80 performs the racing learning for increasing and correcting the engagement-side instruction pressure through learning by using the correction amount ΔPsbc (>0) obtained by using the racing integrated amount S kept at the value at the start time point of the idling-reduction control by the racing amount calculating portion 78.

When it is determined that the racing integrated amount S is less than the predetermined integrated amount Sf, the control state determining portion 76 determines whether the idling-reduction control history flag is set to ON. If it is determined that the racing integrated amount S is less than the predetermined integrated amount Sf and that the idling-reduction control history flag is not set to ON, the control state determining portion 76 determines whether the number of times of maintenance of current tie-up is equal to or greater than the predetermined number of times. If the control state determining portion 76 determines that the number of times of maintenance of current tie-up is equal to or greater than the predetermined number of times, the learning control portion 80 permits the tie-up learning. On the other hand, if the control state determining portion 76 determines that the racing integrated amount S is less than the predetermined integrated amount Sf and then determines that the idling-reduction control history flag is set to ON, the learning control portion 80 inhibits the tie-up learning. In other words, when the control state determining portion 76 determines that the coast downshift is in progress and the control state determining portion 76 then determines that the idling-reduction control history flag is set to ON (i.e., it is determined that the idling-reduction control is started), the learning control portion 80 does not perform the tie-up learning for decreasing and correcting the engagement-side instruction pressure even if the control state determining portion 76 determines that the racing integrated amount S is less than the predetermined integrated amount Sf (i.e., even if it is determined that the turbine rotation speed Nt is not in the excessive racing state during the coast downshift).

Figure 4:
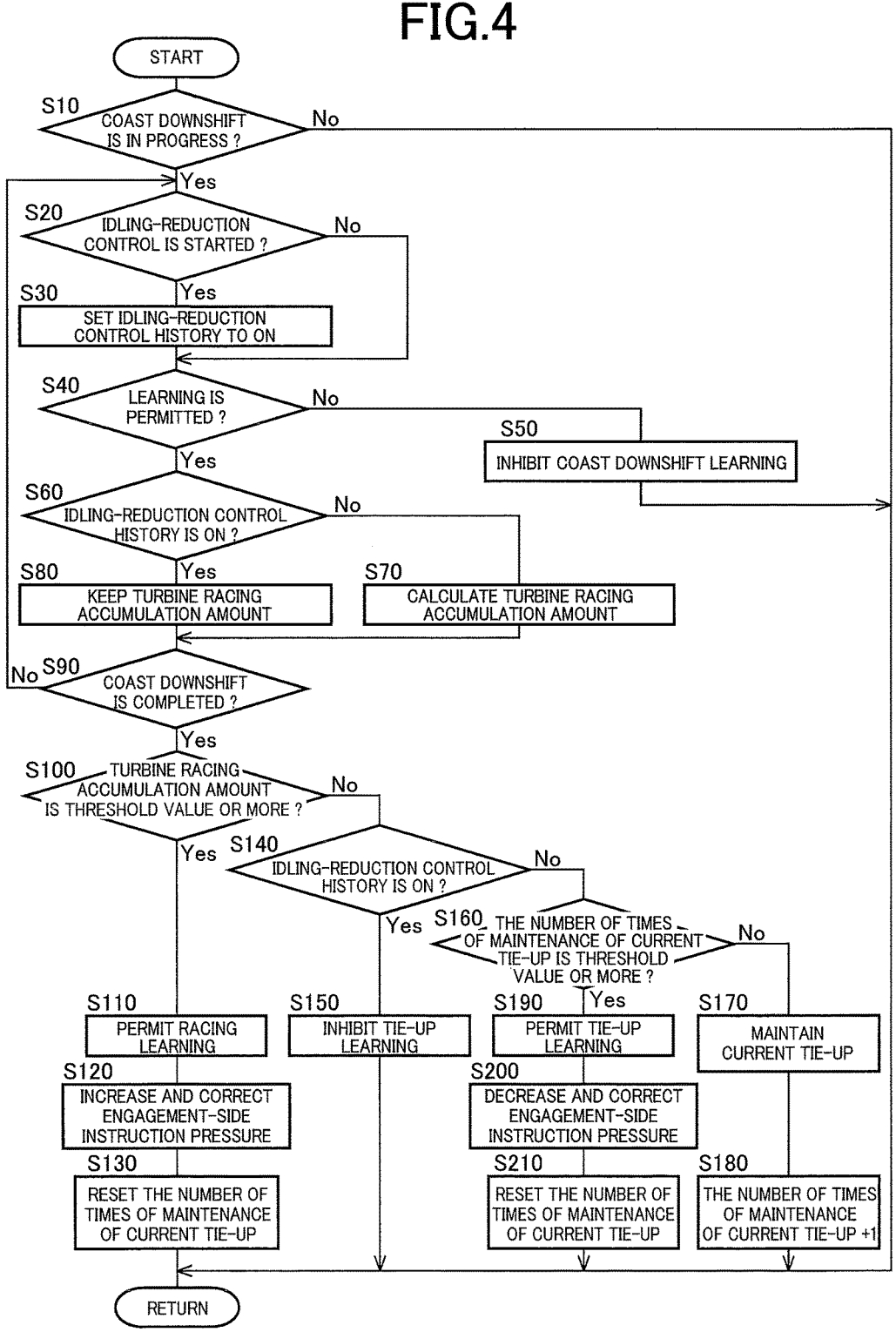
FIG. 4 is a flowchart for explaining a main portion of the control operation of an electronic control device, i.e., the control operation for suppressing a decrease in learning frequency and improving the convergence in learning when the engagement-side instruction pressure is corrected through learning based on a turbine racing integrated amount during the coast downshift of the automatic transmission.
Figure 5:
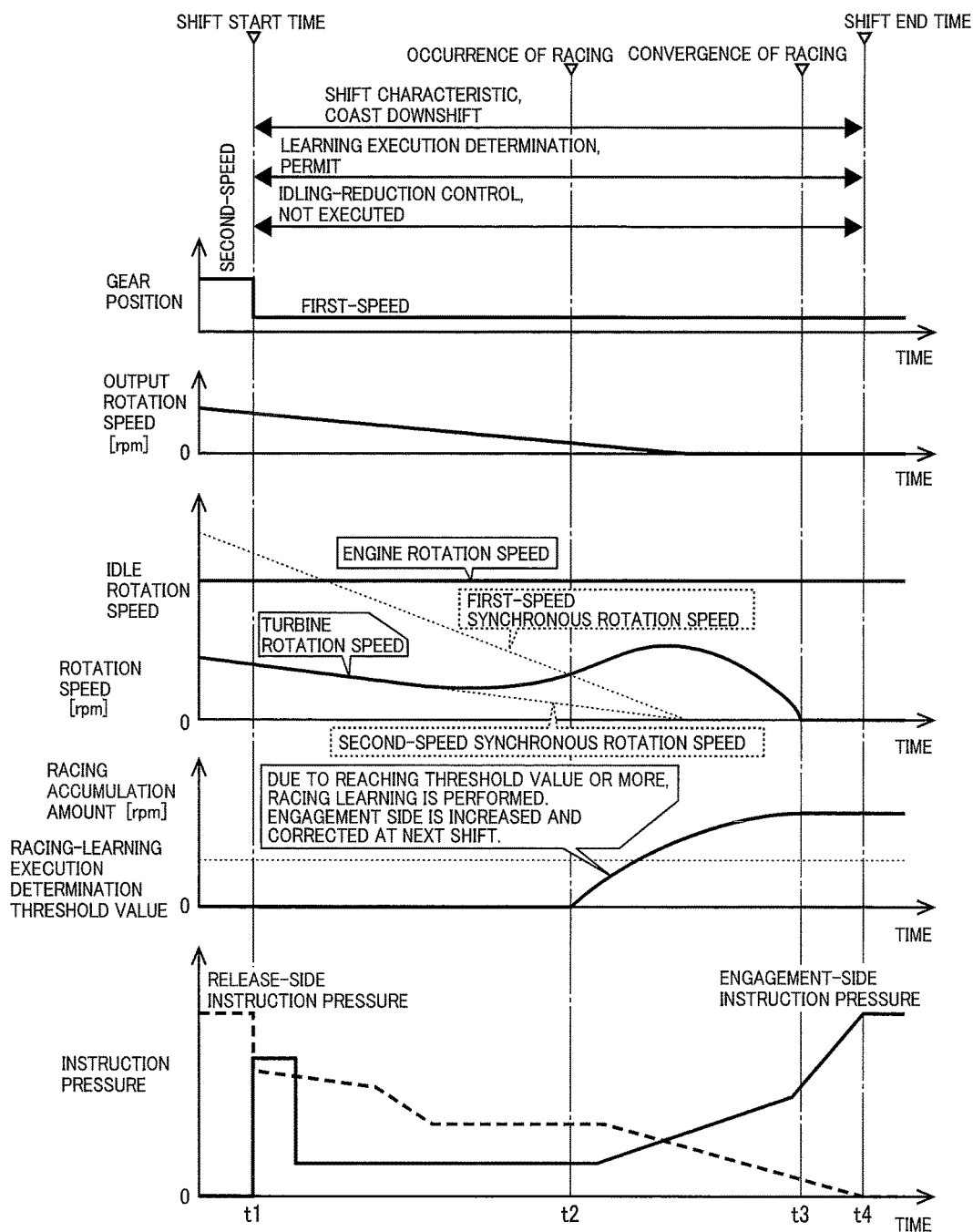
FIG. 5 is a diagram of an example of a time chart when the control operation shown in the flowchart of FIG. 4 is executed in the case of non-execution of idling-reduction control.
Figure 6:
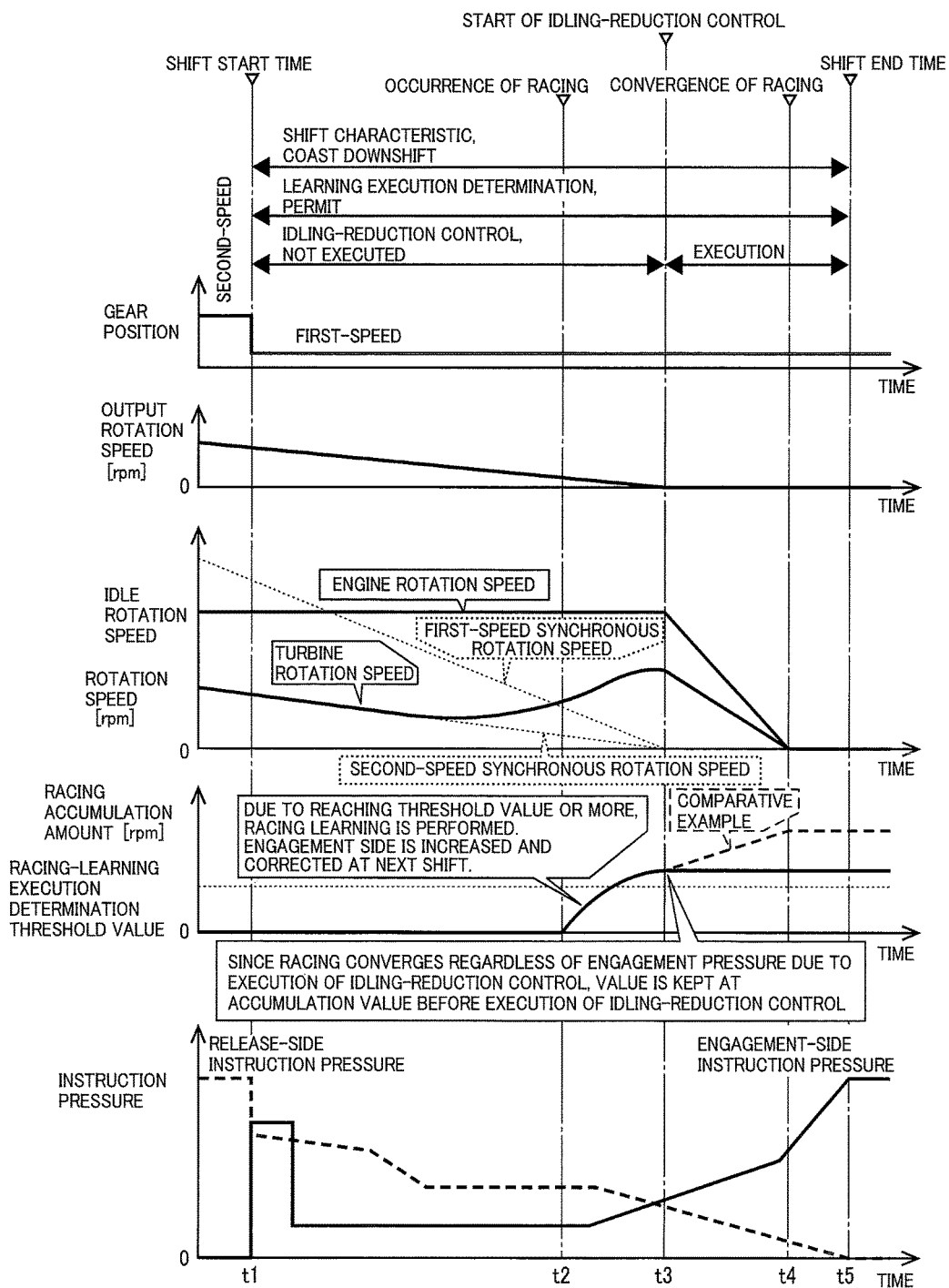
FIG. 6 is a diagram of an example of a time chart when the control operation shown in the flowchart of FIG. 4 is executed in the case of execution of idling-reduction control.

FIG. 4 is a flowchart for explaining a main portion of the control operation of the electronic control device 70, i.e., the control operation for suppressing a decrease in learning frequency and improving the convergence in learning when the engagement-side instruction pressure is corrected through learning based on the turbine racing integrated amount S during the coast downshift of the automatic transmission 22, and the flow chart is repeatedly executed. FIGS. 5 and 6 are respective diagrams of examples of time charts when the control operation shown in the flowchart of FIG. 4 is performed.

In FIG. 4, first, at step (hereinafter, step is omitted) S10 corresponding to the function of the control state determining portion 76, it is determined whether the coast downshift at the turbine rotation speed Nt during the shift transition of the automatic transmission 22 equal to or less than the idle rotation speed of the engine 12 is in progress. If the determination of S10 is negative, this routine is terminated. If the determination of S10 is affirmative, it is determined at S20 corresponding to the function of the control state determining portion 76 whether the idling-reduction control is started. If the determination of S20 is affirmative, the idling-reduction control history flag is set to ON at S30 corresponding to the function of the learning control portion 80. If the determination of S20 is negative, or after S30, it is determined at S40 corresponding to the function of the control state determining portion 76 whether the learning is permitted. If the determination of S40 is negative, the coast downshift learning is inhibited at S50 corresponding to the function of the learning control portion 80. If the determination of S40 is affirmative, it is determined at S60 corresponding to the function of the control state determining portion 76 whether the idling-reduction control history flag is set to ON. If the determination of S60 is negative, the turbine racing integrated amount S used in the coast downshift learning is calculated at S70 corresponding to the function of the racing amount calculating portion 78. If the determination of S60 is affirmative, the turbine racing integrated amount S is kept at the current value of the turbine racing integrated amount S at S80 corresponding to the function of the racing amount calculating portion 78. After S70, or after S80, it is determined at S90 corresponding to the function of the control state determining portion 76 whether the coast downshift of the automatic transmission 22 is completed. If the determination of S90 is negative, the flow goes back to S20. If the determination of S90 is affirmative, it is determined at S100 corresponding to the function of the control state determining portion 76 whether the turbine racing integrated amount S is equal to or greater than the predetermined integrated amount Sf. If the determination of S100 is affirmative, the racing learning is permitted at S110 corresponding to the function of the learning control portion 80. Subsequently, at S120 corresponding to the function of the learning control portion 80, the racing learning is performed for increasing and correcting the engagement-side instruction pressure through learning. Subsequently, at S130 corresponding to the function of the learning control portion 80, the number of times of maintenance of current tie-up is reset to zero. If the determination of S100 is negative, it is determined at S140 corresponding to the function of the control state determining portion 76 whether the idling-reduction control history flag is set to ON. If the determination of S140 is affirmative, the tie-up learning is inhibited at S150 corresponding to the function of the learning control portion 80. If the determination of S140 is negative, it is determined at S160 corresponding to the function of the control state determining portion 76 whether the number of times of maintenance of current tie-up is equal to or more than the predetermined number of times. If the determination of S160 is negative, the current tie-up is maintained at S170 corresponding to the function of the learning control portion 80. Subsequently, at S180 corresponding to the function of the learning control portion 80, the number of times of maintenance of current tie-up is incremented by one. If the determination of S160 is affirmative, the tie-up learning is permitted at S190 corresponding to the function of the learning control portion 80. Subsequently, at S200 corresponding to the function of the learning control portion 80, the tie-up learning is performed for decreasing and correcting the engagement-side instruction pressure through learning. Subsequently, at S210 corresponding to the function of the learning control portion 80, the number of times of maintenance of current tie-up is reset to zero.

FIG. 5 shows one embodiment when the idling-reduction control is not provided during the 2-to-1 coast downshift. In FIG. 5, because of the coast downshift, the engine rotation speed Ne is maintained at the idle rotation speed of the engine 12 and the output rotation speed No of the automatic transmission 22 corresponding to the vehicle speed V is gradually lowered. Additionally, in this 2-to-1 coast downshift, the turbine rotation speed Nt during the shift transition is equal to or less than the idle rotation speed of the engine 12. A release-side instruction pressure and an engagement-side instruction pressure are output as a shift command of the 2-to-1 coast downshift. Time t1 indicates the output start time point of the shift command (i.e., a shift control start time point). As the 2-to-1 coast downshift progresses in accordance with the shift command, the turbine rotation speed Nt is increased toward a first-speed synchronous rotation speed that is the synchronous rotation speed Ntsyc after the downshift. Time t2 indicates the time point of occurrence of racing of the turbine rotation speed Nt. Because the racing of the turbine rotation speed Nt has occurred, the racing integrated amount S is increased. Time t3 indicates the time point at which the racing of the turbine rotation speed Nt converges and the turbine rotation speed Nt is synchronized with the first-speed synchronous rotation speed. Therefore, the racing integrated amount S is increased until time t3. Time t4 indicates the time point at which the release-side instruction pressure is set to the minimum value (zero value) and the engagement-side instruction pressure is set to the maximum value (the complete engagement pressure of the engagement-side engagement device) so that the coast downshift is completed (i.e., the time point of termination of the shift control). In this 2-to-1 coast downshift, the learning execution determination is permitted (i.e., the learning is permitted) and, since the racing integrated amount S is equal to or greater than the racing-learning execution determination threshold value (the predetermined integrated amount Sf), the racing learning is performed. For example, the engagement-side instruction pressure is increased and corrected at the next 2-to-1 coast downshift.

FIG. 6 shows one embodiment when the idling-reduction control is provided during the 2-to-1 coast downshift. In FIG. 6, because of the coast downshift, the engine rotation speed Ne is maintained at the idle rotation speed of the engine 12 until the idling-reduction control is started, and the output rotation speed No of the automatic transmission 22 corresponding to the vehicle speed V is gradually lowered. Additionally, in this 2-to-1 coast downshift, the turbine rotation speed Nt during the shift transition is equal to or less than the idle rotation speed of the engine 12. A release-side instruction pressure and an engagement-side instruction pressure are output as a shift command of the 2-to-1 coast downshift. Time t1 indicates the output start time point of the shift command (i.e., a shift control start time point). As the 2-to-1 coast downshift progresses in accordance with the shift command, the turbine rotation speed Nt is increased toward the first-speed synchronous rotation speed that is the synchronous rotation speed Ntsyc after the downshift. Time t2 indicates the time point of occurrence of racing of the turbine rotation speed Nt. Because the racing of the turbine rotation speed Nt has occurred, the racing integrated amount S is increased. Time t3 indicates the time point of start of the idling-reduction control. As the idling-reduction control is provided, the engine rotation speed Ne is reduced toward zero. The execution of the idling-reduction control facilitates the convergence in the racing of the turbine rotation speed Nt regardless of the engagement-side instruction pressure. Therefore, the racing integrated amount S used for learning is kept at the racing integrated amount S before the execution of the idling-reduction control is started. Time t4 indicates the time point at which the racing of the turbine rotation speed Nt converges and the turbine rotation speed Nt is synchronized with the first-speed synchronous rotation speed. Therefore, if the racing integrated amount S is not kept at time t3, as in a comparative example indicated by a broken line, the racing integrated amount S is increased until time t4 while the racing of the turbine rotation speed Nt is suppressed by the execution of the idling-reduction control (i.e., under the effect of the idling-reduction control). Time t5 indicates the time point at which the release-side instruction pressure is set to the minimum value (zero value) and the engagement-side instruction pressure is set to the maximum value (the complete engagement pressure of the engagement-side engagement device) so that the coast downshift is completed (i.e., the time point of termination of the shift control). In this 2-to-1 coast downshift, the learning execution determination is permitted (i.e., the learning is permitted) and, since the racing integrated amount S is equal to or greater than the racing-learning execution determination threshold value (the predetermined integrated amount Sf), the racing learning is performed. For example, the engagement-side instruction pressure is increased and corrected at the next 2-to-1 coast downshift. The racing integrated amount S shown in the comparative example is affected by the idling-reduction control and, therefore, if the racing integrated amount S of the comparative example is used for the learning, erroneous learning may occur. In this example, since the learning is performed by using the racing integrated amount S kept at the start time point of the idling-reduction control without the effect of the idling-reduction control, the erroneous learning is avoided. Additionally, the learning is not inhibited due to the provision of the idling-reduction control, a reduction in learning opportunity is suppressed.

As described above, according to this example, if the idling-reduction control is started during the coast downshift at the turbine rotation speed Nt during the shift transition of the automatic transmission 22 equal to or less than the idle rotation speed of the engine 12, the turbine racing integrated amount S calculated during the coast downshift is kept at the value at the start time point of the idling-reduction control, and therefore, the engagement-side instruction pressure can be corrected through learning based on the turbine racing integrated amount S not affected by the idling-reduction control. As a result, if the idling-reduction control is executed during the coast downshift, the learning of the engagement-side instruction pressure can be performed while avoiding the erroneous learning due to the effect of the idling-reduction control. Therefore, if the engagement-side instruction pressure is corrected through learning based on the turbine racing integrated amount S during the coast downshift of the automatic transmission 22, a decrease in learning frequency can be suppressed and the convergence in learning can be improved.

According to this example, when the idling-reduction control is started during the coast downshift of the automatic transmission 22 and the racing integrated amount S is in the excessive racing state of being equal to or greater than the predetermined integrated amount Sf, the engagement-side instruction pressure is increased and corrected through learning by using the correction amount ΔPsbc (>0) obtained by using the racing integrated amount S kept at the value at the start time point of the idling-reduction control, and therefore, even when the idling-reduction control is started during the coast downshift, the excessive racing state of the turbine rotation speed Nt can be suppressed in the subsequent coast downshifts.

According to this example, if the idling-reduction control is started during the coast downshift of the automatic transmission 22, the learning for decreasing and correcting the engagement-side instruction pressure is not performed even in the absence of the excessive racing state, and therefore, while the excessive racing state might not have occurred because of a reduction in the engine torque Te due to the idling-reduction control, the erroneous learning due to the effect of the idling-reduction control can be avoided by not performing the learning for decreasing and correcting the engagement-side instruction pressure.

Although the example of the present invention has been described in detail with reference to the drawings, the present invention can be also applied in other forms.

For example, although the coast downshift learning for correcting the engagement-side instruction pressure in the coast downshift of the automatic transmission 22 through learning is the correction made by increasing/decreasing the standby pressure Psbc of the engagement-side instruction pressure in the example described above, the present invention is not limited to this form. For example, the coast downshift learning may be a correction made by changing the output time of the standby pressure Psbc of the engagement-side instruction pressure or a correction made by changing a gradient when the engagement-side instruction pressure is increased from the standby pressure Psbc. In the coast downshift learning described above, the correction amount ΔPsbc is added to the current standby pressure Psbc of the engagement-side instruction pressure so as to correct the engagement-side instruction pressure used in the next coast downshift of the automatic transmission 22; however, a predefined standby pressure Psbc (initial value) may be kept unchanged, and the correction amount ΔPsbc added to the standby pressure Psbc (initial value) may be increased/decreased to correct the next engagement-side instruction pressure. The coast downshift of the automatic transmission 22 is a downshift performed in the deceleration running state with the accelerator turned off and, if the vehicle is in the deceleration running state with the accelerator turned off, the coast downshift may be a downshift performed in a brake-on state in which an operation of actuating a wheel brake is performed. In other words, the deceleration running state with the accelerator turned off includes the brake-on state.

In the example described above, whether the turbine rotation speed Nt is in the excessive racing state is determined based on whether the racing integrated amount S is equal to or greater than the predetermined integrated amount Sf; however, this determination may be made based on the occurrence of racing of the turbine rotation speed Nt. In this case, for example, the predetermined integrated amount Sf may be set to zero.

In the example described above, an embodiment is implemented such that a new turbine racing integrated amount S is calculated to update the current turbine racing integrated amount S to the new turbine racing integrated amount S if the idling-reduction control history flag is not set to ON, while the current turbine racing integrated amount S is kept if the idling-reduction control history flag is set to ON; however, the present invention is not limited to this form. For example, an embodiment may be implemented such that the racing integrated amount S is updated if the idling-reduction control is not started, while the current racing integrated amount S is kept if the idling-reduction control is started (provided). In such a case, for example, in the flowchart of FIG. 4, if the determination of S20 is negative, S70 is executed, and if the determination of S20 is affirmative, S80 is executed after S30 (or before S30), and S40 is executed after S70 or after S80 (or after S30). Additionally, in such a case, the step of S60 is not necessary and, if the determination of S40 is affirmative, S90 is executed. In this way, the flowchart of FIG. 4 may appropriately be changed. Example of change in the flowchart of FIG. 4 may include, for example, executing the step of S40 before executing the step of S20.

In the example described above, one of the predetermined engine stop conditions in the idling-reduction control is that the vehicle is in a stop state in which the vehicle speed V is determined as zero; however, the present invention is not limited to this example. For example, one of the predetermined engine stop conditions may be that the vehicle is in a stop state or the vehicle speed is at a low vehicle speed. In this case, even when the coast downshift is completed before the vehicle stops, the idling-reduction control may be started during the coast downshift. In such a case, the present invention can be applied.

Although the eight forward speed gear positions are established in the automatic transmission 22 in the example described above, the present invention is not limited to this form. The automatic transmission 22 may be any multi-speed transmission having any gear position established out of a plurality of gear positions by engaging predetermined engagement devices out of a plurality of engagement devices. The multi-speed transmission may be a planetary gear type automatic transmission such as the automatic transmission 22 or may be an automatic transmission that is a synchronous meshing type parallel two-shaft automatic transmission such as a known DCT (dual clutch transmission) that is a type of transmission including two systems of input shafts having engagement devices (clutches) respectively connected to the input shafts of the systems and further respectively connected to the even positions and the odd positions of the gear positions. In the case of DCT, the predetermined engagement devices correspond to the engagement devices respectively connected to the input shafts of the two systems.

Although the engine 12 is exemplified as the drive force source of the vehicle 10 in the example described above, the present invention is not limited to this form. For example, another motor such as an electric motor may be employed in combination with the engine 12, as the drive force source. Although the power of the engine 12 is transmitted via the torque converter 20 to the automatic transmission 22, the present invention is not limited to this form. For example, another fluid transmission device such as a fluid coupling without a torque amplification effect may be used instead of the torque converter 20. Alternatively, this fluid transmission device may not necessarily be provided in the vehicle.

The above description is merely an embodiment and the present invention can be implemented in variously modified and improved forms based on the knowledge of those skilled in the art.

REFERENCE SIGNS LIST

10: Vehicle
12: Engine
22: Automatic transmission (Multi-speed transmission)
70: Electronic control device (Control device)
72: Engine control portion
74: Shift control portion
78: Racing amount calculating portion
80: Learning control portion
C1 to C4: First to fourth clutch (Engagement device)
B1, B2: First, second brake (Engagement device)

What is claimed is:

1. A vehicle control device in a vehicle including an engine and a multi-speed transmission having a plurality of gear positions, each gear position out of the plurality of gear positions established by engaging predetermined engagement devices out of a plurality of engagement devices, the vehicle control device including a shift control portion configured to control release of a release-side engagement device of the plurality of engagement devices and engagement of an engagement-side engagement device of the plurality of engagement devices so as to switch the gear position established in the multi-speed transmission, and an engine control portion configured to provide idling-reduction control of temporarily stopping the operation of the engine based on a predetermined engine stop condition, the vehicle control device comprising:
 a racing amount calculating portion configured to calculate, during a coast downshift in which an input rotation speed during a shift transition of the multi-speed transmission is equal to or less than an idle rotation speed of the engine, an integrated value of a racing amount of the input rotation speed that is an excess amount of the input rotation speed over a synchronous rotation speed after the coast downshift; and
 a learning control portion configured to obtain and learn a correction amount for an instruction pressure of the engagement-side engagement device to be engaged during the coast downshift by using the integrated value of the racing amount so as to correct the instruction pressure of the engagement-side engagement device,
 if the idling-reduction control is started during the coast downshift, the racing amount calculating portion being configured to keep the integrated value of the racing amount at a value at the start time point of the idling-reduction control.

2. The vehicle control device according to claim 1, wherein when the idling-reduction control is started during the coast downshift and the integrated value of the racing amount is in an excessive racing state of being equal to or greater than a predetermined integrated value, the learning control portion increases and corrects the instruction pressure of the engagement-side engagement device through learning by using the correction amount obtained by using the integrated value of the racing amount kept at the value at the start time point of the idling-reduction control.

3. The vehicle control device according to claim 2, wherein when the integrated value of the racing amount is not in the excessive racing state of being equal to or greater than the predetermined integrated value during the coast downshift, the learning control portion decreases and corrects the instruction pressure of the engagement-side engagement device through learning by using a predetermined correction amount on condition that the number of times of the coast downshifts performed in a state other than the excessive racing state without being followed by correction of the instruction pressure of the engagement-side engagement device is equal to or greater than a predetermined number of times, and wherein
 when the idling-reduction control is started during the coast downshift, the learning control portion does not perform learning for decreasing and correcting the instruction pressure of the engagement-side engagement device even in the absence of the excessive racing state.

4. The vehicle control device according to claim 1, wherein when the integrated value of the racing amount is not in an excessive racing state of being equal to or greater than the predetermined integrated value during the coast downshift, the learning control portion decreases and corrects the instruction pressure of the engagement-side engagement device through learning by using a predetermined correction amount on condition that the number of times of the coast downshifts performed in a state other than the excessive racing state without being followed by correction of the instruction pressure of the engagement-side engagement device is equal to or greater than a predetermined number of times, and wherein when the idling-reduction control is started during the coast downshift, the learning control portion does not perform learning for decreasing and correcting the instruction pressure of the engagement-side engagement device even in the absence of the excessive racing state.

* * * * *